United States Patent [19]

Walch et al.

[11] Patent Number: 4,720,343

[45] Date of Patent: Jan. 19, 1988

[54] MACROPOROUS ASYMMETRICAL HYDROPHILIC MEMBRANE MADE OF A SYNTHETIC POLYMER

[75] Inventors: Axel Walch, Frankfurt am Main; Juergen Wildhardt, Huenstetten; Dieter Beissel, Weisbaden, all of Fed. Rep. of Germany

[73] Assignee: Hoechst Aktiengesellschaft, Frankfurt am Main, Fed. Rep. of Germany

[21] Appl. No.: 448,764

[22] Filed: Dec. 10, 1982

[30] Foreign Application Priority Data

Dec. 17, 1981 [DE] Fed. Rep. of Germany ....... 3149976

[51] Int. Cl.$^4$ .............................................. B01D 13/04
[52] U.S. Cl. .......................... 210/500.28; 210/500.33; 210/500.38; 210/500.41; 210/500.42
[58] Field of Search ........... 210/490, 500, 506, 500.28, 210/500.33, 500.38, 500.41, 500.42; 55/158; 422/48

[56] References Cited

U.S. PATENT DOCUMENTS

| | | | |
|---|---|---|---|
| 3,615,024 | 10/1971 | Michaels | 210/490 |
| 3,775,308 | 11/1973 | Yasuda | 210/23 |
| 4,026,977 | 5/1977 | Bourganel | 210/490 X |
| 4,051,300 | 9/1977 | Klein et al. | 428/398 |
| 4,207,182 | 6/1980 | Marze | 210/23 |
| 4,208,508 | 6/1980 | Hashino | 528/175 |
| 4,229,291 | 10/1980 | Walch et al. | 210/500.2 X |
| 4,230,583 | 10/1980 | Chiolle et al. | 210/490 |

FOREIGN PATENT DOCUMENTS

3018667 11/1981 Fed. Rep. of Germany .

OTHER PUBLICATIONS

Cabasso et al., "Porosity and Pore Size Determination in Polysulfone Hollow Fibers", J. of Applied Polymer Science, vol. 21, 1883–1900 (1977).

Cabasso et al., "Polysulfone Hollow Fibers. I. Spinning and Propertie", J. of Applied Polymer Science, vol. 20, 2377–2394 (1976).

W. Pusch and A. Walch, "Synthetic Membranes: State of the Art," *Desalination*, vol. 35 (1980), pp. 5–20.

Tadashi Uragami et al., "Studies on Synthesis and Permeability of Special Polymer Membranes," *Polymer Bulletin*, vol. 4 (1981), pp. 617–622.

*Primary Examiner*—David Sadowski
*Attorney, Agent, or Firm*—Schwartz, Jeffery, Schwaab, Mack, Blumenthal & Evans

[57] ABSTRACT

Disclosed are asymmetrical macroporous membranes based on a synthetic polymer comprising a polymeric mixture of 5 to 70% by weight polyvinylpyrrolidone having a molecular weight ≧100,000 Dalton and 95 to 30% by weight of a polymer selected from a group consisting of a polysulfone, a polyether sulfone and an aromatic or araliphatic polyamide, each of the percentages by weight being relative to the total weight of the polymeric mixture. The membrane has a water absorbency of at least 11% by weight of water, relative to its total weight, at 100% relative humidity and 25° C. Also disclosed is a process for preparation of the membranes.

6 Claims, No Drawings

MACROPOROUS ASYMMETRICAL HYDROPHILIC MEMBRANE MADE OF A SYNTHETIC POLYMER

BACKGROUND OF THE INVENTION

The present invention relates to macroporous asymmetrical hydrophilic membranes made of a synthetic polymer and to a process for their preparation.

Since the introduction of asymmetrical membranes made of cellulose acetate, by Loeb and Sourirajan, (S. Sourirajan, *Reverse Osmosis*, Logos Press, London 1970), and made of hydrophobic polymers (U.S. Pat. No. 3,615,024), numerous membranes have been developed and proposed, in particular for separating out low molecular weight and macromolecular constituents dissolved in water. The structure and suitability of these membranes have been indicated in the literature (*Desalination*, 35 (1980), 5-20), and they have also been used with success in industry or for medical purposes.

Many of the membranes described have properties which are particularly advantageous for solving specific tasks. However, a membrane which can be used equally well in different application areas is not available. Owing to their chemical structure and the way in which they are put together, the membranes described can be optimally suitable only for specific separation problems. This results in the fundamental requirement of always developing new membranes for new problems.

Thus, for example, the concentration polarization, which always arises on membrane surfaces and which, in many cases, leads to membrane fouling and to the formation of a secondary membrane, has the effect that the qualitative and quantitative chemical composition of the polymer forming the membrane frequently has a strong influence on the properties of the membrane. This is in addition to the influence of the membrane structure, for example, its asymmetrical structure, or the membrane geometry which is expressed in its capillary or microporous structure.

Relatively hydrophilic ultrafiltration membranes made of cellulose acetate are highly suitable, for example, for separating certain proteins from their aqueous solution, since the membranes in contact with aqueous solutions have only weak adsorptive properties for these proteins. However, these membranes are not sufficiently stable to aggressive chemical agents, in particular those which are capable of effecting hydrolysis of the polymer forming the membrane, and the properties of these membranes also change in an undesirable manner on exposure to temperatures above 40° C. Both the membrane properties mentioned considerably restrict the use of such membranes.

Admittedly, asymmetrical hydrophobic membranes, for example, those based on polysulfone, polyvinylidene fluoride or other hydrophobic polymers, have satisfactory resistance to hydrolysis and to elevated temperatures and to oxidizing agents. However, when in contact with dissolved macromolecules, dispersions and the like, for example, oil emulsions, cataphoretic varnishes or proteins, which tend to form deposits, these membranes frequently and rapidly lose their activity, inter alia due to precipitation and adsorption of constituents of the solution onto and into the membrane.

To avoid these disadvantages it has already been proposed to develop hydrophilized membranes from hydrophobic and stable polymers. For example, the addition of aerosils to polysulfones has enabled their wettability in aqueous solutions to be improved. It has also been proposed to prepare membranes from mixtures of polyvinylidene fluoride and polyvinyl acetate. In order to impart hydrophilic properties to membranes made from this polymeric mixture, it is necessary, however, to subject them to hydrolysis in order to convert the acetate groups contained in this polymeric mixture into OH groups. The attempt to prepare hydrophilic membranes having satisfactory properties by preparing them from a mixture of a hydrophobic polymer and an originally hydrophobic polymer, for example, from polyvinylidene fluoride and polyvinylpyrrolidone, has not had the success desired, because it was only possible to prepare membranes from this mixture which contained at most 15-20% by weight of polyvinylpyrrolidone, but which did not have the properties of products according to the invention.

It has also been proposed to prepare hydrophilic membranes by starting from a solution of a hydrophobic polymer which contains, relative to the total weight of the solution, up to 150% by weight of polyethylene glycol (*Polymer-Bulletin* 4, 617-622, 1981). However, membranes of this type do not have adequate hydrophilic properties, since the hydrophilic component contained in them is eluted from the coagulated membrane by the aqueous coagulating liquid during the coagulation process.

German Offenlegungsschrift No. 2,651,818 describes a membrane which is comprised of a mixture of polysulfone and sulfonated polysulfone. The known membrane can contain up to 30% by weight, relative to the total weight of the polymeric mixture forming the membrane, of the hydrophilic polymer component. However, the known membrane, when used as an ion exchange membrane, has the fundamental disadvantage that it adsorbs positive counter-ions and repels co-ions of the same charge as the membrane.

It has also been proposed (German Auslegeschrift No. 2,829,630) to prepare a membrane having hydrophilic properties from a hydrophobic polymer by starting from a polysulfone solution which contains low molecular weight salts and preparing membranes from this solution in a manner which is in itself known, using the phase inversion method. However, the water sorption of these known membranes is unsatisfactory, because the salts are removed from the membranes in their preparation or during use, so that the hydrophobic character of the polymer which forms the membrane essentially determines its properties.

A porous membrane which is comprised of a mixture of polyvinylpyrrolidone and aromatic polysulfone is described in *J. Appl. Pol. Sci.*, 21, 1883-1900 (1977). However, this reference does not provide any directive for preparing, for example, membranes which are fouling-resistant, reactive, biocompatible or suitable for hemodiafiltration. The authors admittedly use mixtures containing polyvinylpyrrolidone, but with the object of thereby obtaining high viscosities and good fiber-forming properties. For this reason they only employ polyvinylpyrrolidone which has a maximum molecular weight of 40,000, preferably only 10,000, with the express object of eluting this additive as early as during membrane formation in the aqueous coagulation bath so that no polyvinylpyrrolidone remains in the membrane (*J. Appl. Pol. Sci.* 20, 2377-2394 (1976)). A membrane which has the specific properties in accordance with the invention can therefore not be produced.

The prior art has sought to provide hydrophilic membranes which have a high water sorption and which possess only to a slight extent the disadvantages summarized under the heading "membrane fouling", but this has still not been satisfactorily accomplished by the state of the art. Another object, not yet achieved by known membranes, is to form asymmetrically and macroporously structured and sufficiently hydrophilic membranes, which ensure high permeability and, at the same time, satisfactory pressure-stability and safe handling. The desirable properties of the type of membrane mentioned also embrace improved resistance to dilute organic solvents, a wider spectrum of the molecular weight exclusion limit (in particular in the transition range from ultrafiltration to microfiltration or to hyperfiltration) and the capability of use in the medical field, for example, for plasmapheresis or hemodiafiltration. In order to be suitable for use in the medical field, the membrane must have considerably higher diffusive permeabilities for toxic metabolites having a molecular size below the particular molecular weight exclusion limit of the membrane and also a good biocompatibility in contact with blood.

Admittedly, there are available hydrophilic membranes which have a high diffusive permeability, for example, gel-like membranes made of regenerated cellulose or of a polycarbonate block polymer, and which have sufficiently high water absorbency, but the known hydrophilic membranes of this type do not have a macroporous and asymmetrical structure, which is the prerequisite for additionally obtaining, for example, high mechanical permeability and pressure stability. Moreover, these hydrophilic membranes again do not have the virtues (for example, the chemical resistance) of hydrophobic membranes.

Admittedly, hydrophobic polymers are capable of forming macroporous asymmetric structures, but usually inadequate wettability and blood compatibility thereof, and also their low diffusive permeabilities preclude, for example, the use in medicine of membranes made of this material.

SUMMARY OF THE INVENTION

It is therefore an object of the present invention to provide macroporous asymmetrical membranes based on a synthetic polymer.

It is also an object of the invention to provide such membranes which have pronounced hydrophilic properties, i.e., are capable of absorbing considerable amounts of water, relative to their total weight.

Another object of the invention resides in providing such membranes which are resistant to hydrolyzing agents as well as oxidizing agents and to thermal action.

Still another object of the invention is to provide such membranes which are able to withstand dilute organic solvents better than membranes made of a hydrophobic polymer.

It is also an object of the invention to provide such membranes which make possible a molecular weight exclusion limit of greater than 100,000 Dalton and smaller than 10,000 Dalton.

Another object of the invention resides in the provision of such membranes which have, compared to membranes made of a hydrophobic polymer, improved diffusive permeability, good wettability, biocompatibility and low membrane fouling.

A further object is to provide such membranes which have functional groups, for example, for bonding or generating permselective or reactive layers and which can nevertheless be prepared by the phase inversion method into pressure-stable membranes having a high permeability.

Yet another object of the invention resides in providing a process for the production of the membranes according to the invention.

In accomplishing the foregoing objects, there has been provided in accordance with one aspect of the present invention an asymmetrical macroporous membrane, comprising a polymeric mixture comprised of from about 5–70% by weight of polyvinylpyrrolidone having a molecular weight $\geq 100,000$ Dalton and from about 95 to 30% by weight of a polymer selected from polysulfone, polyether sulfone, or an aromatic or araliphatic polyamide, the percentages by weight being relative to the total weight of the polymeric mixture, and the membrane having a water absorbency of at least about 11% by weight of water, relative to its total weight, at 100% relative humidity and 25° C.

In accordance with another aspect of the invention, there has been provided a process for preparing a membrane as described above, comprising the steps of forming a macroporous asymmetrical membrane from a polymer solution by action of a coagulating liquid, wherein the polymer solution comprises as the dissolved fraction a polymeric mixture comprised of from about 5–70% by weight of polyvinylpyrrolidone having a molecular weight of $\geq 100,000$ Dalton and from about 95–30% by weight of a polymer selected from a group consisting of a polysulfone, a polyether sulfone and an aromatic or araliphatic polyamide, relative to the total weight of the dissolved polymeric fraction.

Further objects, features and advantages of the present invention will become apparent from the detailed description of preferred embodiments which follows.

DETAILED DESCRIPTION OF PREFERRED EMBODIMENTS

The invention is realized by a macroporous asymmetrical membrane which has pronounced hydrophilic properties and which is comprised of a random mixture of synthetic polymers comprising 5–70% by weight of polyvinylpyrrolidone having a molecular weight $\geq 100,000$ Dalton and of 95–30% by weight of a polycondensate selected from a group consisting of polysulfone, polyether sulfones and aromatic or araliphatic polyamides, with each of the percentages by weight being relative to the total weight of the polymeric mixture.

Membranes which have pronounced hydrophilic properties are to be understood as meaning, by definition within the scope of the present invention, those which are capable at 100% relative humidity of absorbing at least 11% by weight of water relative to their total weight. The water absorbency of membranes according to the invention can be, for example, 15–30% by weight.

Membranes which have an anisotropic pore structure comprise an active outer layer which effects the separation process desired and which has, for example, a thickness within a range of from about 0.2–3 μm and contains pores having a diameter within the range of from about 0.001–0.05 μm. There is a transition of this separating layer into a support layer which has an openporous structure, the pore size of which is within a range of from about 0.05-10 μm.

Asymmetrical membranes accordingly have a density gradient in the direction from one outer face of a membrane to the other, or they have been formed in such a way that their density decreases from either outer face of the membrane toward the center of the membrane.

A membrane which has been formed with the porous structure indicated is termed, within the scope of the present invention, a macroporous membrane of asymmetrical structure.

The terms polysulfone and polyether sulfone are used for polymers having a molecular structure which is characterized by the fact that they are built up from recurring structural units of the following general formula (I):

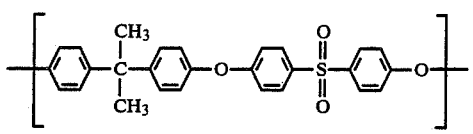

or by molecular chains or recurring structural units of the formula:

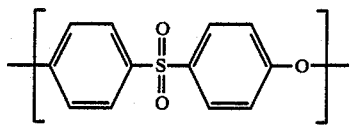

The expression "polysulfone" should apply in this text in the broadest sense, that is, not only to polymers which also contain alkyl groups in the chain but also to those which only contain aryl groups in the chain and are sometimes referred to as "polyaryl sulfones".

A polysulfone which can be used is the polymer marketed by Union Carbide under the designation "P 1700", which has a linear chain of the general formula (I).

Polysulfones or polyether sulfones of this type are known and these polymers per se are not the subject of the present invention.

Polyamides are to be understood as meaning those polymers which are formed by polycondensing multifunctional carboxylic acids (or their derivatives) with multifunctional amines (or their derivatives). At least one of these multifunctional monomers should have an aromatic structure. Examples of suitable polyamides are those wherein the molecular chains are built up from recurring chemical structural units of the formula:

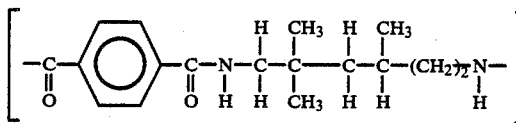

The polyamides per se likewise are not the subject of the present invention.

The polyvinylpyrrolidone present in the membrane is characterized by a molecular weight of 100,000 Dalton or a molecular weight of greater than 100,000 Dalton; the molecular chains of polyvinylpyrrolidone are comprised of recurring structural units of the formula:

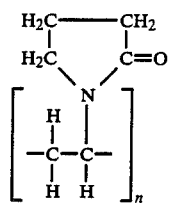

in which n is >900.

The >N—CO—CH$_2$ groups of polyvinylpyrrolidone or the —NH—CO groups of polyamides are called latent reactive groups, since they are ready and capable of chemical reaction under certain thermal and/or chemical conditions.

The polymers of which the membrane is composed can be present in this membrane linked by chemical bonding; this linkage is either due to the fact that chemically reactive groups of adjacent high molecular weight compounds of the designated type have chemically reacted with one another or due to the fact that in each case chemically reactive groups of adjacent high molecular weight chemical compounds have each chemically reacted with reactive groups of those chemical low molecular weight compounds which are called chemical crosslinking agents because they are capable of effecting chemical linkage of designated high molecular weight compounds. Examples of low molecular weight chemical compounds capable of crosslinking the indicated high molecular weight chemical compounds are isocyanates, aldehydes and epoxides.

The presence in the membrane of polymer molecules which are linked to one another by chemical bonding is responsible for the fact that membranes having such a structure have a greater density than those membranes in which the polymer molecules are present in the unlinked state. Due to the molecular linkage, the particular membranes have reduced separating limits, and due to the linkage the particular membranes have a high proportion of polyvinylpyrrolidone molecules fixed by chemical bonding.

However, the reactive groups of the polymers can also serve to bond other molecules chemically. For example, enzymes or anticoagulants can be fixed on the membrane. In addition, permselective layers can also be bonded to or generated in the membrane surface in this way.

The membrane according to the invention is characterized by the following properties or parameters:

high pH and oxidative stability and thermal stability, comparable to the hyrophobic polymer fraction;

compared to the "pure" hydrophobic membrane polymer, improved stability to dilute organic solvents (for example, alcohols or ketones);

extended molecular weight exclusion limits (separating limits) of greater than 100,000 Dalton (as well as smaller than 10,000 Dalton);

reduced membrane fouling, and better compatibility and wettability with aqueous media, for example, to proteins or dispersed solvent constituents (i.e., for example, longer membrane life or biocompatibility with higher permselectivity);

a diffusive permeability for low molecular weight solvent constituents (for example, urea) which is five to ten times higher than that of a hydrophobic membrane;

hydrophilic functionalization of the hydrophobic membrane polymer, for example, to bond or generate permselective or reactive layers; and higher mechanical permeability and pressure stability compared to "pure" hydrophilic membranes.

A membrane according to the invention can be prepared, for example, as follows:

High molecular weight polyvinylpyrrolidone having a molecular weight of 100,000 Dalton or greater than 100,000 Dalton and, for example, polysulfone are each dissolved in a polar organic solvent which is miscible with water and in which the above-mentioned polymers are soluble in an amount which is such that the polymer solution thereby formed contains polyvinylpyrrolidone in an amount of about 1–20% by weight and polysulfone in an amount of about 5–50% by weight, each relative to the total weight of the polymer solution. Examples of organic solvents which can be used are N-methylpyrrolidone, dimethyl sulfoxide, dimethylformamide and dimethylacetamide. An inorganic salt, for example, lithium chloride, is optionally added to the solution in an amount of from about 1–8% by weight, relative to the total weight of the solution. The salt addition specified does not affect the properties desired according to the invention of the membranes which can be prepared from the designated solution. The addition of inorganic salts to solutions from which membranes can be prepared by the phase inversion method is described in the literature and is not per se the subject of the present invention.

An asymmetrical macroporous membrane is prepared in a known manner by the phase inversion method from the polymer solution composed qualitatively and quantitatively as specified. For this purpose, the polymer solution is spread as a liquid layer onto a planar substrate. The planar substrate can consist, for example, of a glass plate.

A coagulating liquid, which is miscible with the solvent of the solution but in which the polymers dissolved in the polymeric solution are precipitated as the membrane, is then allowed to act on the liquid layer, and, surprisingly, even polyvinylpyrrolidone, which is originally soluble in the coagulating agent, "solidifies". The coagulating liquid used is, for example, water. The action of the coagulating liquid on the liquid layer of the polymeric solution precipitates the polymers dissolved in this polymeric solution, with the formation of a macroporous film which has an asymmetrical pore structure and contains the polymers designated in random distribution.

In carrying out the process, the coagulating liquid is advantageously allowed to act on the membrane precipitated by the coagulating liquid until virtually the entire solvent has been replaced in this membrane by coagulating liquid. The membrane formed is then freed of coagulating liquid, for example, by directly drying the membrane in an air stream or first treating the membrane with a plasticizer such as glycerol and then drying.

To prepare designated membranes, which are located on a support layer which is permeable to flowable media, the procedure given above is followed, but the substrate used as a support for forming the membrane layer is a web or paper, and after the membrane layer has been formed, the membrane layer is left on the substrate. However, the membrane can also first be prepared without a support and only then be applied to a permeable support.

Hollow filaments or capillaries can also be prepared from the polymer solution in a known manner by spinning the polymer solution through an appropriately shaped annular die or hollow needle die into a coagulating liquid according to the state of the art.

If the membrane is them impregnated with glycerol, it can preferably contain glycerol in a range of from about 5–60%, relative to its total weight. The membrane thus impregnated is dried, for example, at a temperature of 50° C. In a modification of the described preparation method, a special membrane can be prepared by the following method: the starting material is a polymer solution which is as indicated above but which is distinguished from the first-mentioned polymer solution by the fact that it contains a chemical compound which is capable of crosslinking and in which the reactive groups are capable of entering a chemical reaction with the designated reactive groups of polymer molecules contained in the solution. The polymer solution can contain, for example, chemical compounds capable of crosslinking in an amount within the range of from about 0.1–15% by weight, relative to the total weight of the dissolved polymers. Suitable chemical compounds capable of crosslinking include aldehydes, such as, for example, glutardialdehyde or formaldehyde, and isocyanates, for example, toluylene diisocyanate.

In another possible process variant, chemical linkage of polymer molecules is effected, without using chemical compounds capable of crosslinking, by exploiting the reactivity of polyvinylpyrrolidone. For example, the membrane can be subjected to an after-treatment with radical formers or in an alkaline medium (pH $\geq 12$) at an elevated temperature in order to bring about intermolecular or intramolecular crosslinking of adjacent chain segments of high molecular weight polyvinylpyrrolidone.

In another possible way of preparing the membrane, the membrane is first prepared in the manner indicated, and chemical linkage of polymer molecules contained in this membrane is brought about by allowing chemical compounds of the type mentioned which are capable of crosslinking to act sufficiently long on the membrane or by subsequently performing the "self-crosslinking", described above, of polyvinylpyrrolidone. Appropriate reactions can be carried out to bind permselective layers to the membrane or to generate permselective layers directly on or in the membrane. Thus, for example, "ultra-thin" layers ($\leq 1$ $\mu$m) made of polymers containing functional groups (for example silicones, cellulose ethers or fluoro-copolymers) can be spread on water, applied from there to the membrane surface and covalently fixed, for example, by reaction with a diisocyanate, to thus obtain higher permselectivities. Analogously, the membrane according to the invention is also suitable as a support for reactive molecules, for example, to fix enzymes or anticoagulants such as heparin, according to the state of the art.

EXAMPLES

Example 1

12% by weight of polysulfone (for example, a product of bisphenol A and dichlorodiphenylsulfone marketed by Union Carbide under the name "Type Udel 3,500") was dissolved in a solution of N-methylpyrrolidone which contained 6% by weight of polyvinylpyrrolidone (molecular weight: 350,000) and 4% by weight of lithium chloride in a stirred vessel (12 hours, room temperature). The polymer solution (viscosity: 25,000 mPa.s) was deaerated and applied by means of a casting device in accordance with U.S. Pat. No. 4,229,291 to a polyethylene (spunbonded) support web (39 g/m²) and coagulated in water at 20° C. The membrane was impregnated with a solution of 40% by weight of glycerol and dried at 50° C. The dry support-reinforced membrane had a thickness of 180 μm and a water absorption of 29% by weight at a temperature of 25° C.

Example 2

10% by weight of polysulfone was dissolved in the manner of Example 1 in a solution of N-methylpyrrolidone which contained 8% by weight of polyvinylpyrrolidone and 4% by weight of lithium chloride (viscosity: 45,000 mPa.s) and coagulated analogously to give a membrane. The dry and support-reinforced membrane had a thickness of 160 μm and a water absorption of 47% by weight at a temperature of 25° C.

Example 3

12% by weight of polysulfone 3,500 was dissolved in the manner of Example 1 in a solution of N-methylpyrrolidone which contained 6% by weight of polyvinylpyrrolidone without the addition of LiCl. The polymer solution (viscosity: 6,000 mP.s) was deaerated and applied by means of a casting device in accordance with U.S. Pat. No. 4,229,291 to a polyethylene film (100 μm) and coagulated in water at 30° C. The membrane was impregnated with a solution of 40% by weight of glycerol, dried at 60° C. and separated from the support film. The support-free membrane thus dried had a thickness of 80 μm and a water absorption of 24% by weight at 25° C.

Example 4

12% by weight of polyamide (in accordance with the structural formula given in the specification) was dissolved in the manner of Example 3 in a solution of N-methylpyrrolidone which contained 6% by weight of polyvinylpyrrolidone. A dry and support-free membrane with a thickness of 80 μm was prepared therefrom.

Example 5

A polymer solution according to Example 1 was coagulated directly into water at 30° C. by means of a hollow needle spinneret (external diameter: 600 μm, internal diameter: 300/100 μm), with water being additionally introduced into the interior of the capillaries to generate an asymmetrical structure with an interior "skin". The capillaries had a diameter of 550 μm and a wall thickness of 85 μm.

Example 6

The membranes according to Examples 1 to 4 were characterized as follows:

a. The water absorption is measured on support-free membranes after storage at 100% relative humidity and 25° C. to constant weight (the membrane treated in this manner had first been dried for 24 hours over $P_2O_5$).

b. The mechanical permeability (ultrafiltration) and the retention capacity in respect of dissolved macromolecules are determined under pressures of 0.1 to 3.0 bar at 20° C. in a stirred cylindrical cell (500 rpm, 350 ml) (membrane surface: 43 m²). The retention capacity is defined as $$R = \frac{C_1 - C_2}{C_1} \times 100\%$$

($C_1$=concentration of an aqueous solution containing 1% by weight of dextran 70,000 or a polyacrylic acid 20,000 or of bovine albumin (250 mg/l) and $C_2$=concentration in the permeate). The concentration measurement is carried out in a digital DMA 60+601 density measuring instrument (Heraeus-Paar).

c. The diffusive permeability is measured (in accordance with O. B. Laugh and D. P. Stokesberry, National Bureau of Standards, Report No. PB 179,669, 1968) on support-free membranes at 37° C. for aqueous solutions of 1,500 ppm of urea or of 1,000 ppm of vitamin B12. The concentration difference is continuously determined in a "Lamidur" differential refractometer (Winopal). The results are summarized in the following table.

| MEMBRANE | MECHANICAL PERMEABILITY ($10^3$ l/m²d) | | | RETENTION CAPACITY (%) | | | | DIFFUSIVE PERMEABILITY ($10^3$ cm/min) | |
|---|---|---|---|---|---|---|---|---|---|
| | | | | Albumin | | Dextran 70,000 | PAS 20,000 | | |
| | 0.1 bar | 1 bar | 3 bar | 0.1 bar | 1 bar | 0.1 bar | 3 bar | Urea | Vitamin $B_{12}$ |
| Example 1 | 220 | 1,900 | 5,300 | 90 | 87 | 72 | 55 | — | — |
| Example 2 | 86 | 960 | 2,400 | 94 | 83 | 95 | 54 | — | — |
| (support free, 60 μm) | (120) | (850) | (2,700) | (30) | (10) | (35) | (—) | (61) | (15) |
| Example 3 | 150 | 1,000 | 3,400 | — | — | 98 | — | 45 | 11 |
| Example 4 | 280 | 2,000 | — | — | 75 | — | — | — | — |
| Example 5 | 390 | — | — | 40 | — | — | — | 40 | 10 |

What is claimed is:

1. An asymmetrical macroporous membrane, comprising: a polymeric mixture comprised of from about 5–70% by weight of polyvinylpyrrolidone having a molecular weight ≧100,000 Dalton and from about 95 to 30% by weight of a polymer selected from polysulfone, polyether sulfone, or an aromatic or araliphatic polyamide, the percentages by weight being relative to the total weight of the polymeric mixture, and the membrane having a water absorbency of at least about 11% by weight of water, relative to its total weight, at 100% relative humidity and 25° C.

2. A membrane as claimed in claim 1, wherein the polymeric mixture is comprised of from about 5–70% by weight of polyvinylpyrrolidone and from about 95–30% by weight of polysulfone.

3. A membrane as claimed in claim 1, wherein the polymeric mixture is comprised of from about 5–70% by weight of polyvinylpyrrolidone and from about 95–30% by weight of polyether sulfone.

4. A membrane as claimed in claim 1, wherein the polymeric mixture is comprised of from about 5-70% by weight of polyvinylpyrrolidone and from about 95-30% by weight of an aromatic or araliphatic polyamide.

5. A membrane as claimed in claim 1, wherein the molecules of the polymers forming the membrane are linked to one another by chemical bonding.

6. A membrane as claimed in claim 1, further comprising at least one permselective or reactive layer generated or bonded on or in the membrane.

* * * * *